United States Patent [19]

Jacobs et al.

[11] Patent Number: 4,917,336
[45] Date of Patent: Apr. 17, 1990

[54] MOUNTING ASSEMBLY FOR UNDUCTED PROP ENGINE AND METHOD

[75] Inventors: Loyd D. Jacobs; Belur N. Shivashankara, both of Bellevue, Wash.

[73] Assignee: The Boeing Company, Seattle, Wash.

[21] Appl. No.: 157,911

[22] Filed: Feb. 19, 1988

[51] Int. Cl.4 .............................................. B64C 21/04
[52] U.S. Cl. ....................................... 244/207; 244/54; 244/130
[58] Field of Search ................... 244/54, 130, 207, 208

[56] References Cited

U.S. PATENT DOCUMENTS

| | | |
|---|---|---|
| 1,585,218 | 5/1926 | Watanabe . |
| 1,868,832 | 7/1932 | Henter et al. ......................... 244/65 |
| 2,944,727 | 7/1960 | Foley et al. . |
| 3,101,920 | 8/1963 | Fradenburgh ...................... 244/130 |
| 3,144,999 | 8/1964 | Rogallo ............................... 244/130 |
| 3,420,502 | 1/1969 | Howald . |
| 3,572,960 | 3/1971 | McBride . |
| 3,934,410 | 1/1976 | Williams . |
| 4,156,344 | 5/1979 | Cuthbertson et al. . |
| 4,199,295 | 4/1980 | Raffy et al. . |
| 4,255,083 | 3/1981 | Andre et al. . |
| 4,419,045 | 12/1983 | Andre et al. . |

FOREIGN PATENT DOCUMENTS

| | | |
|---|---|---|
| 111822 | 11/1964 | Czechoslovakia . |
| 2138507 | 10/1984 | United Kingdom ................. 244/54 |

*Primary Examiner*—Sherman D. Basinger
*Assistant Examiner*—Thomas J. Brahan
*Attorney, Agent, or Firm*—Hughes & Multer

[57] ABSTRACT

An engine assembly comprising an engine having an unducted propeller mounted in a pusher configuration. The engine is supported by a mounting strut located upstream of the propeller. The trailing edge portion of the strut discharges air through a rearwardly facing slot to diminish discontinuity of airflow moving from the region of the strut to the propeller, so that load variations on the propeller are diminished, and also improves flow of the intersection of the strut and the fuselage.

10 Claims, 6 Drawing Sheets

VERTICAL LOCATION AFT OF THE STRUT

MOUNTING ASSEMBLY FOR UNDUCTED PROP ENGINE AND METHOD

BACKGROUND OF THE INVENTION

1. Field of the Invention

The present invention relates to a mounting assembly for an unducted prop engine, and a method relating to the same, and more particularly to such a prop engine having a pusher configuration, with a mounting strut being positioned forwardly of the propeller path, and with pressurized air being blown from a trailing edge of the strut in a manner to alleviate discontinuity in the velocity gradient caused by the wake of the strut to obtain benefits relative to vibration, noise, and performance.

2. Background Art

It is common to mount an engine to aircraft structure by means of an aerodynamically contoured mounting strut interconnecting the engine to the aircraft structure. When the engine is an unducted prop engine of the pusher type, generally the strut will be positioned upstream of the propeller, so that the airstream passing on the two side surfaces of the strut flows through the propeller path. The presence of the strut will generally create a wake which results in a discontinuity in the adjacent airflow, which in turn results in the blades of the propeller experiencing a difference in angle of attack as the blades pass through the wake of the strut. This variation in angle of attack results in a variation in aerodynamic lift loading on the propeller which in turn results in unwanted vibrations being generated, with these vibrations being transmitted through the structure of the engine and through the strut to the aircraft structure. Another consideration is that this discontinuity of airflow through the propeller path generates unwanted noise which can propagate both to the interior of the aircraft as well as to exterior locations.

A further consideration is the effect of boundary layer air adjacent to the juncture location of the strut to the aircraft structure. For example, with the engines being mounted to the aft portion of the fuselage, there is a tendency for a relatively thick boundary layer to develop at the juncture location of the strut with the fuselage. If the propeller is mounted so that the tip path is relatively close to the fuselage, this thicker boundary layer results in a further discontinuity in the airflow passing through the propeller path and aggravates the problems noted above.

The design of engine mounting struts is generally something of a compromise between the aerodynamic and structural requirements. The aerodynamicist would prefer that the strut be as thin as possible to reduce aerodynamic drag, while the structures specialist would prefer to have the strut with a greater thickness dimension so that the engine could be properly supported with structural components with less mass. Further, the aerodynamicist would prefer the chordwise dimension of the strut to be as small as possible to minimize the wetted area. With regard to optimizing performance of the propeller, it would of course be desirable to have the strut totally "invisible" so that the propeller would encounter an airstream which is as uniform as possible.

A search of the patent literature has revealed a number of patents which deal with the interaction of the stationary vanes and rotor blades of the compressor/fan section of a jet engine. These generally have addressed the problems of community noise where engine noise is propagated to exterior locations, such as populated areas adjacent to the airport. The rotor of a fan jet engine may have as many as forty blades, and these rotate at velocities as high as 4,800 revolutions per minute. The noise which is generated is generally at a relatively high frequency (e.g., 3,200 Hz), which generally can be effectively treated by acoustic linings in the nacelles.

For example, U.S. Pat. No. 3,572,960 (McBride) discloses a system where the inlet guide vanes and the rotor blades of the fan of a fan jet engine are provided with slots running lengthwise of the radially outward portion of the trailing edges. Pressurized air is discharged from these slots to minimize the circumferential velocity gradients immediately downstream of the vanes and blades. This is done to reduce the sound generated by the air entering the rotor blades and the outlet guide vanes. To the best knowledge of the applicants herein, while it has been recognized that this system can reduce engine noise, it has not been incorporated in commercial aircraft.

Other patents noted in the search of the patent literature are the following.

U.S. Pat. No. 1,585,218 (Watanabe) discloses what is called, "Soundless Double Propeller for Airplanes". There is a forward and an aft propeller mounted to a shaft, and these propellers are spaced so that with a given velocity of the airplane, the sound waves generated by the two propellers interfere with each other, and it is alleged that these will cancel each other in a manner to reduce the noise that is generated.

U.S. Pat. No. 2,944,729 (Foley et al) shows an axial flow compressor, of the type used in an aircraft, where the stator blades have at the trailing ege of the stator blades slots 22 at the concave surface of these blades near the rear end thereof. The slots 22 are arranged to blow air in a direction normal to the surface of the vane. This is done to modify the airflow in a manner to change the angle of attack of the blades of the rotor stage immediately behind. Also, such slots can be provided in forward and rear sets of vanes so that air inducted into one set of slots can be directed to the interior of the other set of vanes to be discharged through the slots at that other set of vanes.

U.S. Pat. No. 3,420,502 (Howald) shows a fluid cooled airfoil, where cooling air is circulted through the interior of the airfoil and then discharged through the trailing edge. This is intended for use in turbines or the like where the airfoil blades are often exposed to relatively high temperatures.

U.S. Pat. No. 3,934,410 (Williams) discloses a propeller configuration where there is a shroud surrounding the propeller blades. The propeller blades employ a tangential slot along the trailing edge of each propeller blade and air is blown from the tangential slot over the trailing edge. It is stated that the lift is proportional to the momentum flow of the air out of the slot, and is substantially independent of the rotational velocity. This is done to reduce noise and also increase efficiency.

U.S. Pat. No. 4,156,344 (Cuthbertson et al) discloses a system for use in the inlet of the fan of a fan jet engine, where there is provided in the outer duct wall openings to divert a portion of the airflow at a location immediately downstream of the inlet guide vanes. This has the effect of reducing the noise generated in that area.

U.S. Pat. No. 4,255,083 (Andre et al) discloses a system for reducing the noise in the compressor section of a turbine. Air is injected through orifices located in the stationary components in the compressor section. The flow through the orifices is modulated at the frequency of the noise to be reduced and with a phase difference which increases in an incremental manner from one orifice to the next. The acoustic waves generated are opposite in phase with respect to the noise which is to be reduced. This system is also disclosed in U.S. Pat. No. 4,419,045, which is a divisional application of U.S. Pat. No. 4,255,083.

Czechoslovakian Pat. No. 111,822 discloses what appears to be the inlet of a turbine engine, with air being discharged through the trailing edge of the forward set of stator vanes of the compressor section. The translation of that patent is not presently available.

Swiss Pat. No. 225,231 was also noted in the search. A translation of this patent is not presently available, and it is difficult to discern from the drawing the operation of the apparatus shown.

SUMMARY OF THE INVENTION

The engine assembly of the present invention comprises an aircraft structure and an engine having an unducted propeller means, with the engine being mounted in the assembly in a pusher configuration, and with the propeller means being adapted to rotate through a propeller path. There is a strut located forwardly and upstream of the propeller means.

The strut has a leading edge portion and a trailing edge portion, and it is aerodynamically contoured so as to have first and second side surfaces over which air flows. The trailing edge portion has a rearwardly directed slot means positioned to discharge air in a downstream direction between air flow passing over the side surfaces of the strut, with the air discharged from the slot means traveling downstream to an affected area of the propeller path.

There is air supply means to discharge pressurized air through the slot means at a velocity adequate to diminish discontinuity of air flow moving from the strut rearwardly to the affected path region of the propeller path. Thus, load variations on the propeller means passing through the affected region of the propeller path are diminished so as to in turn diminish unwanted vibrations transmitted from the propeller means into the engine, reduce noise and improve performance.

In the preferred embodiment shown herein, the strut is connected between the aircraft structure and the engine in a manner to support the engine from the strut. The aircraft structure is a fuselage, and the engine is mounted to an aft section of the fuselage. Further, in the preferred form, the engine is a turboprop engine.

With regard to the location of the slot means, the slot means is desirably located at least at a radially outward direction, relative to the propeller path, so that air discharged from the slot means travels rearwardly to a radially outward portion of the affected region of the propeller path. Also, in a preferred form, the strut has a first inner end adjacent said structure and a second outer end adjacent said engine, and the slot means extends radially beyond the propeller path towards the first end of the strut. Thus, at least some of the air discharged from the slot means passes adjacent the aircraft structure at a location radially outward of the propeller path.

In one form, the slot means and the air supply means are arranged so that for each unit of length along the slot means, a relatively greater amount of air is discharged from the slot means at a location more closely adjacent to an inner end of the strut, in comparison with an amount of air discharged at a location directly forward of the outward location of the propeller path. This can conveniently be accomplished by providing the slot means with a greater width dimension at the inward location adjacent to the fuselage.

In one configuration, the slot means is formed as a slot at the trailing edge of the strut. In another configuration, the slot means is provided as a pair of slots on the trailing edge side surface portions, with the air being discharged generally parallel to the air flow over the side surfaces of the strut.

In the method of the present invention, an apparatus is provided as described above. The air is discharged through the slot means in a manner to alleviate discontinuity in the air flow rearwardly from the strut generally in the manner described above.

Other features of the present invention will become apparent from the following detailed description.

DESCRIPTION OF THE PREFERRED EMBODIMENTS

Figure 1:
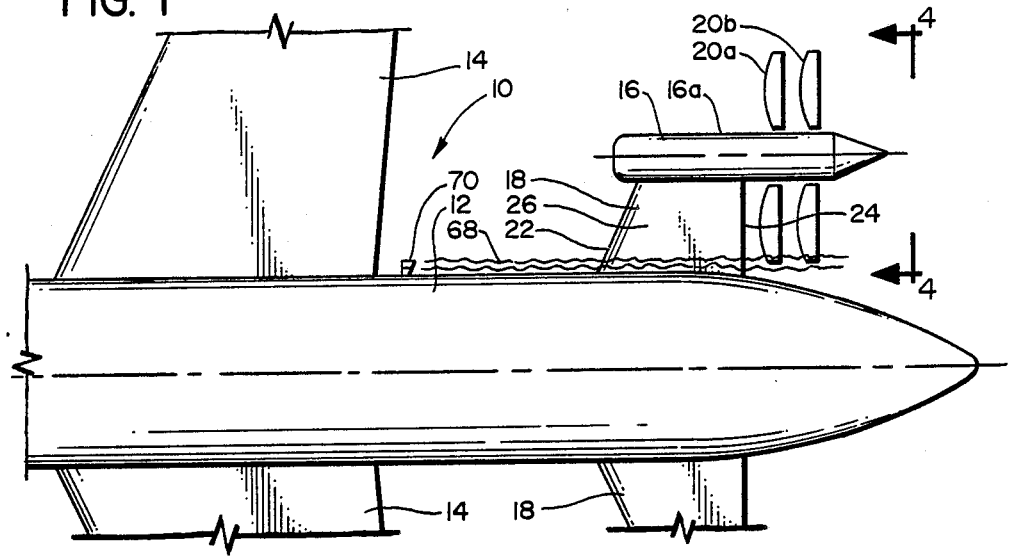
FIG. 1 is a top plan view of an aircraft, illustrating the engine mounting assembly of the present invention.
Figure 2:
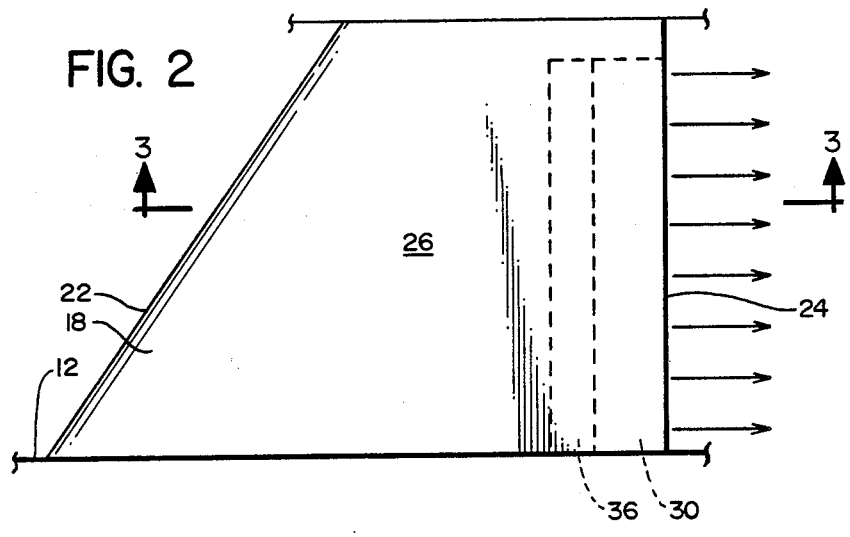
FIG. 2 is a top plan view of the pylon or strut by which the engine is mounted to the aft portion of the aircraft fuselage, this being drawn to an enlarged scale.

In FIG. 1, there is shown an aircraft 10 having a fuselage 12, wings 14 (partially shown), two aft mounted engines 16 (only one of which is shown) and two pylons or struts 18 by which the engine 16 is mounted to the aft end of the fuselage 12. Each engine 16 is in this particular embodiment a turboprop engine having two sets of counter-rotating propellers 20, (namely a forward set 20a and a rear set 20b) mounted aft of the struts 18. Each strut 18 has a leading edge 22, a trailing edge 24, and two side surfaces (FIG. 2), namely an upper surface 26 and a lower surface 28. The strut 18 is aerodynamically contoured to minimize aerodynamic drag.

Figure 3:
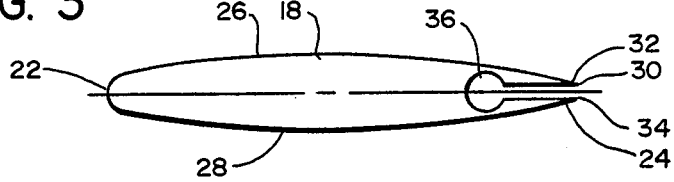
FIG. 3 is a sectional view taken along line 3—3 of FIG. 2.

An important feature of the present invention is the manner in which the trailing edge portion 24 of each strut 18 is modified. As shown in FIG. 3, the trailing edge 24 is provided with an elongated slot 30 which extends in a spanwise direction at the trailing edge 24. This slot 30 is defined by upper and lower end edges 32 and 34, respectively, which terminate at the trailing edge of the upper and lower aerodynamic surfaces 26 and 28. The slot 30 is arranged to discharge air in a rearward direction generally parallel to the air flowing over the upper and lower strut surfaces 26 and 28.

The rear portion of each strut 18 is provided with a blowing air plenum 36 which is arranged to receive pressurized air from a suitable source (e.g., bleed air from the compressor section of its related engine 16 (or from a separate pump) and to discharge this air rearwardly through the slot 30. As will be described more fully hereinafter, this has the effect of alleviating discontinuities in the airflow proceeding rearwardly from the area of the strut 18, such discontinuities resulting from the wake created by the strut 18.

Figure 4:
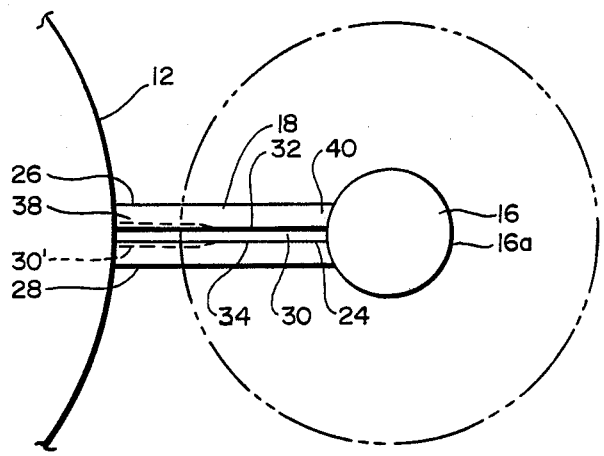
FIG. 4 is an elevational view taken at the location indicated at 4—4 in FIG. 1, looking forwardly toward the rear of the engine nacelle and the mounting strut.

With reference to FIG. 4, it can be seen that the slot 30 extends from a first inner end 38 of the strut 18 adjacent to the fuselage 12 to a second outer end 40 adjacent to the nacelle 16a of the engine 16. Also, the slot 30 is shown to be of uniform cross-section or depth. For a full-scale aircraft, the vertical dimension (i.e., the width dimension) of this slot 30 can be approximately one-quarter of an inch. However, as will be disclosed hereinafter, the location and thickness dimension of this slot 30 can be modified so as to optimize the performance of the pressurized air discharged rearwardly through the slot 30.

Figure 5:
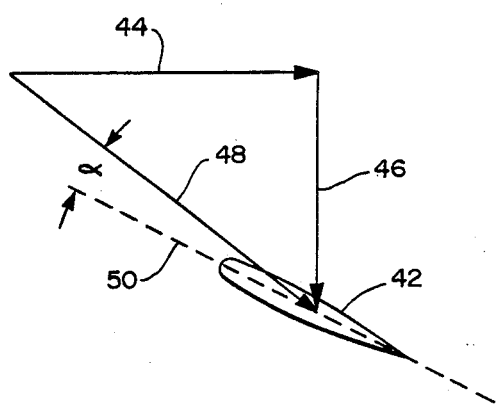
FIG. 5 is a schematic view illustrating the angle of attack of a propeller blade, to indicate how change in airstream velocity can affect angle of attack of a blade rotating at a constant speed with the same angular dispositon.

To analyze the effect of this slot, reference is made to FIG. 5, which illustrates the action of a propeller blade 42 relative to the velocity vectors. First, there is a flow vector 44 which represents the flow of the main air stream. Then there is the vector 46 representing the linear velocity of the propeller blade 42 at a particular propeller spanwise location. The resultant velocity vector is shown at 48. As shown in FIG. 5, there is a neutral chordwise axis 50 of the blade 42 (this axis 50 being a line at which the blade 42 generates zero lift when the air stream through which it is travelling is parallel to the axis 50), and the angle of attack is indicated at α.

Figure 6:
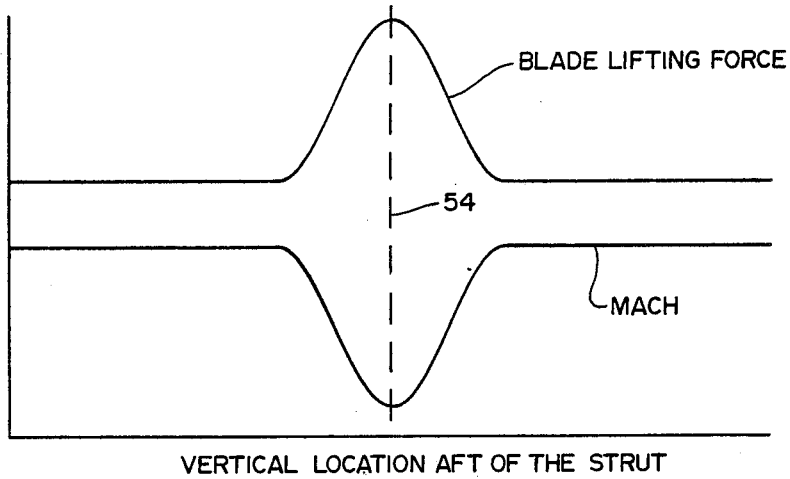
FIG. 6 is a graph illustrating how the lifting force of the blade varies with changes in the velocity of the airstream which the blade encounters when moving in the region downstream of the strut, without the benefit of the present invention.

It can readily be seen from observing FIG. 5 that if the velocity of the air stream 44 flowing towards the propeller is reduced, the angle of attack of the blade 42 will generally increase, thus increasing the aerodynamic force on the blade 42. (However, in some instance, the force could decrease, depending on the change in magnitude of the resultant velocity vector.) This is illustrated in FIG. 6, where the vertical location rearwardly of the trailing edge of the strut 18 is plotted along the horizontal axis, while the blade lifting force and the airstream speed of the flow to the propeller is plotted along the vertical axis. A broken line indicated at 54 is the location rearwardly of the strut trailing edge 24 which is in alignment (relative to free stream flow) with the trailing edge 24. This represents the situation where there is no pressurized air blown from the slot 30. The air velocity rearwardly of the strut trailing edge 24 decreases relative to the air velocity at locations above and below the wake of the strut. It can be seen in FIG. 6 that as the airstream velocity decreases aft of the strut, the aerodynamic force exerted on the propeller blade 42 increases as the propeller blade 42 travels through the reduced velocity area of the strut wake.

The purpose of the present invention is to compensate for the effect of the reduction in free airstream velocity due to the wake of the strut 18. The pressurized air discharged from the slot 30 increases the velocity of the air in the strut wake to make the overall flow aft of the strut 18 more uniform.

Figure 7:
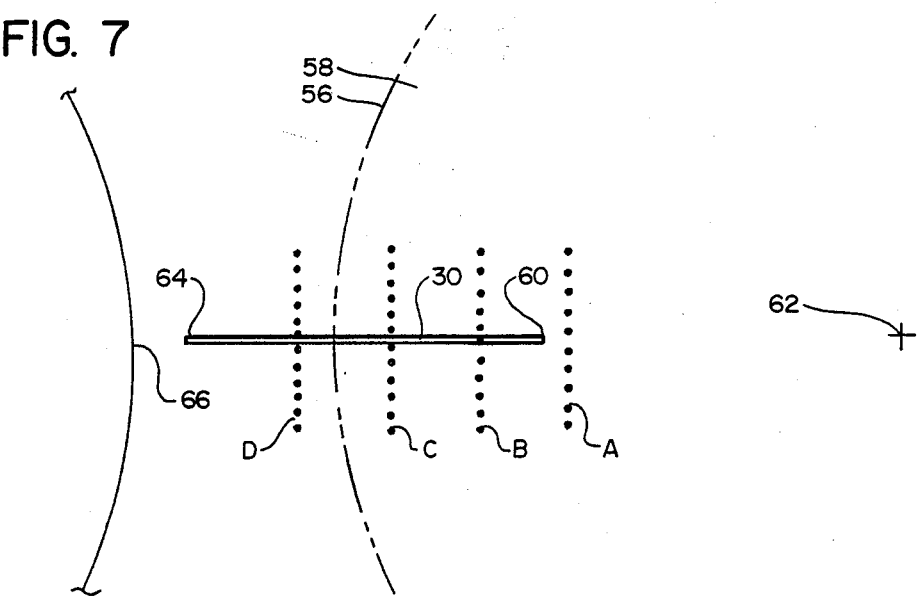
FIG. 7 is a view similar to FIG. 4, showing a wind tunnel setup for the present invention, and also indicating locations at which pressure readings were taken aft of the trailing edge of the strut or pylon.

To ascertain the effectiveness of the present invention, a one-fifth scale model of the present invention as shown herein was made for wind tunnel testing, and this is illustrated schematically in FIG. 7. The outer circumferential edge 56 of the propeller path 58 is shown, and it can be seen that the slot 30 begins at an outer slot location 60 which is positioned outwardly from the propeller axis of rotation by a distance slightly greater than one-half of the radius of the propeller, measured from the center axis of rotation 62. The inner edge 64 of the slot 30 terminated closely adjacent to the outer surface 66 of the fuselage 12. Pressurized air was discharged through the slot 30, and by means of Pitot tubes, velocity was determined at various vertical locations along four transverse stations, designated A, B, C and D, as illustrated in FIG. 7, with the dots indicating the location of the readings.

Figure 8:
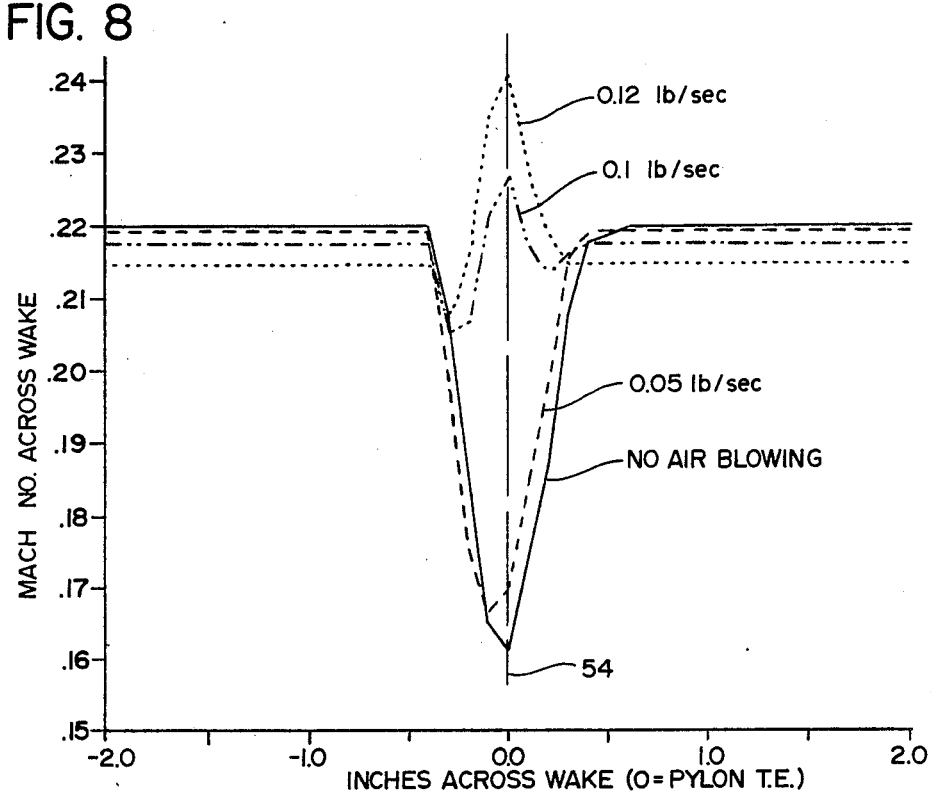
FIG. 8 is a graph indicating the pressure readings at Station B, as shown in FIG. 7 with the full line showing pressure with no blowing from the lines indicating the air velocities at various mass flow rates of air out of the trailing edge.

The velocities at Station B are illustrated in FIG. 8, where the Mach number at the various vertical locations are shown in a solid line when there was no air blown through the slot 30. It can be seen that a location immediately behind the trailing edge of the strut, the velocity was at a minimum centered about broken line 54 (FIG. 6). Then there is illustrated in three broken lines the effect achieved by discharging pressurized air through the slot 30. It can be seen when there was a mass flow rate 0.05 pounds per second of air, there was very little effect on the velocity deficit. However, at a flow rate of 0.1 pounds, there was a greatly reduced velocity deficit which, while having some irregularities, was more nearly constant. With a flow rate of 0.12 pounds per second, there was a greater peak velocity than that achieved with the flow rate of 0.1 pounds per second.

Figure 9:
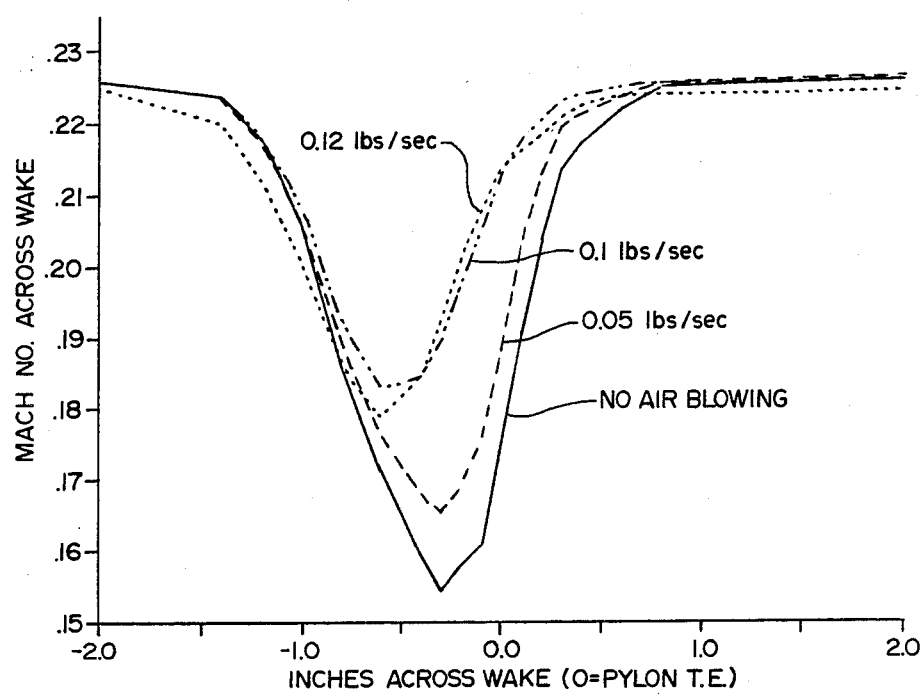
FIG. 9 is a graph similar to FIG. 8, but showing the Mach number at Station D.

FIG. 9 illustrates the readings which were taken at Station D, which is closer to the fuselage, and slightly outside of the outer edge 56 of the propeller path 58. It can be seen that the effect of discharging the pressurized air through the slot 30 had less effect in alleviating the discontinuity of the airflow rearwardly of the trailing edge of the strut. It is surmised that this is due to the thickening of the boundary layer air in the vicinity of the juncture of the fuselage 12 with the strut 18. As illustrated in FIG. 1, the boundary layer air 68 which flows along the fuselage has a velocity gradient illustrated at 70 in somewhat exaggerated form. As this boundary layer air 68 moves into the vicinity of the strut 18, it tends to thicken at the juncture of the strut 18 with the fuselage 12. It is believed that the presence of this boundary layer air accounts for what appears to be the greater effect of the inner end portion 38 (FIG. 4) of the strut 18 in creating a somewhat greater velocity discontinuity in the wake of the strut 18. For this reason, it is believed that an improvement can be achieved by making the width of the slot 30 in the area near to the fuselage of a greater width. This is illustrated in FIG. 4 by the broken line 30' illustrating an alternate configuration of the slot 30, where the slot 30' is made with a greater thickness adjacent to the fuselage 12. Also, it may be desirable to terminate the slot 30 or 30' short of the engine, since the discontinuity in air flow is less of a problem at the hub portions of the propeller blades, and this would reduce the amount of pressurized blowing air used.

A related consideration is that the presence of this relatively slower boundary layer air in the vicinity of the junction of the strut 18 and fuselage 12 also has an effect on the performance of the propeller 20. As indicated previously, as portions of the propeller 20 encounter free stream velocity of a lower value, there is an increase in the resisting force against the propeller, and this can be a source of unwanted vibrations. Thus, if the velocity discontinuity can be alleviated due to the boundary layer effects at the juncture of the strut 18 with the fuselage 12, this would under some circumstances make it possible to mount the propellers 20 so that these would be somewhat closer to the fuselage 12. It should further be recognized that the tip regions of an unducted propeller react with the air rather differently than the tip regions of a ducted propeller, and the tip regions of the unducted propeller are rather critical relative to the generation of vibrations and noise.

To describe the operation of the present invention, as the propeller 20a and 20b are rotated, pressurized air is directed into the two blowing air plenums 36 and discharged rearwardly through the slots 30. The pressure of this air is controlled so as to achieve the proper mass flow rate and velocity of the air flowing rearwardly through the slots 30 of the two struts 18. In general, this velocity of air discharged from the slots 30 should be slightly greater than the free stream velocity of the ambient air. As described above, the effect of this is to compensate for the velocity deficit that occurs in the wakes of the struts 18, thus tending to make the airflow from the trailing edge 24 of the strut 18 more uniform. The effect of this is that the forward propeller set 20b encounters a more uniform flow field, thus alleviating variations in the aerodynamic resisting force encountered by the propeller blades 42.

With regard to the functional features of the present invention, it should be understood that the problems encountered by an unducted propeller functioning in the configurations shown herein are in a sense somewhat unique to this particular situation. In accordance with modern propeller designs anticipated for use in present-day aircraft, there can be as many as eight to twelve propeller blades 42 in each set 20a or 20b. With the diameter of the propeller path being possibly as great as approximately twelve feet, the rotational velocity could be about 1500 revolutions per minute. This would mean that the propeller blades 42 would be passing the location rearwardly of the strut 18 at a frequency of about 250 per second. Thus, to compare this with similar noise frequencies generated by the compressor sections of turbojet engines or turbofan jet engines, the vibrations envisioned in the environment of the present invention are of relatively low frequency.

It should be recognized that as the propeller blade 42 encounters an increased aerodynamic force in the wake flowing from the strut 18 (without the blowing of the present invention), this results in a momentary increase in the torque exerted by the propeller through the propeller hub into the engine, and also an increase in a force initiated along a line generally parallel to the center axis of the engine. With the blades passing through the area rearwardly of the strut 18 at a frequency of about 250 times per second, there is a vibration at this relatively low frequency transmitted into the engine 16, with this vibration being transmitted through the structure of the strut 18 and thence into the structure of the fuselage 12, causing not only vibration of structure, but noise radiation into the cabin of the airplane.

Such an unwanted vibration can have the adverse effect of accelerating the accumulation of fatigue damage on the structural components affected. Also this vibration can result in unwanted interior cabin noise. This relatively low frequency vibration transmits through the structure with relatively little attenuation, causing significant cabin vibration and noise. In this respect, the results achieved by the present invention are believed to be rather different than those achieved, for example, in a system where air is discharged from the trailing edges of the rotor blades and vanes of the fan of a jet engine, where the vibrations and generated noise are at a relatively very high frequency. The high frequency of those noises, while extremely undesirable with regard to community noise considerations, do not couple well with aircraft structure and do not cause adverse fatigue damage on the structure. The high frequency of those vibrations do not relatively easily transmit through structure. To the extent that the present invention does have the effect of alleviating unwanted noise by the reduction of the amplitude of these vibrations, there is functional similarity to the use of such air blowing in the fans of fan jet engines.

With regard to the problem of the growth of the thickness of the boundary layer air at the junction of the strut 18 in the fuselage 12, by extending the blowing from the trailing edge of the strut 18 into the area very close to the fuselage (i.e., beyond the outer tip path 56 of the propellers 20) there is the beneficial effect of alleviating the undesirable effects of boundary layer growth, with the possibility of permitting the propellers 20 to be mounted yet more closely to the outer surface of the fuselage 12.

Figure 10:
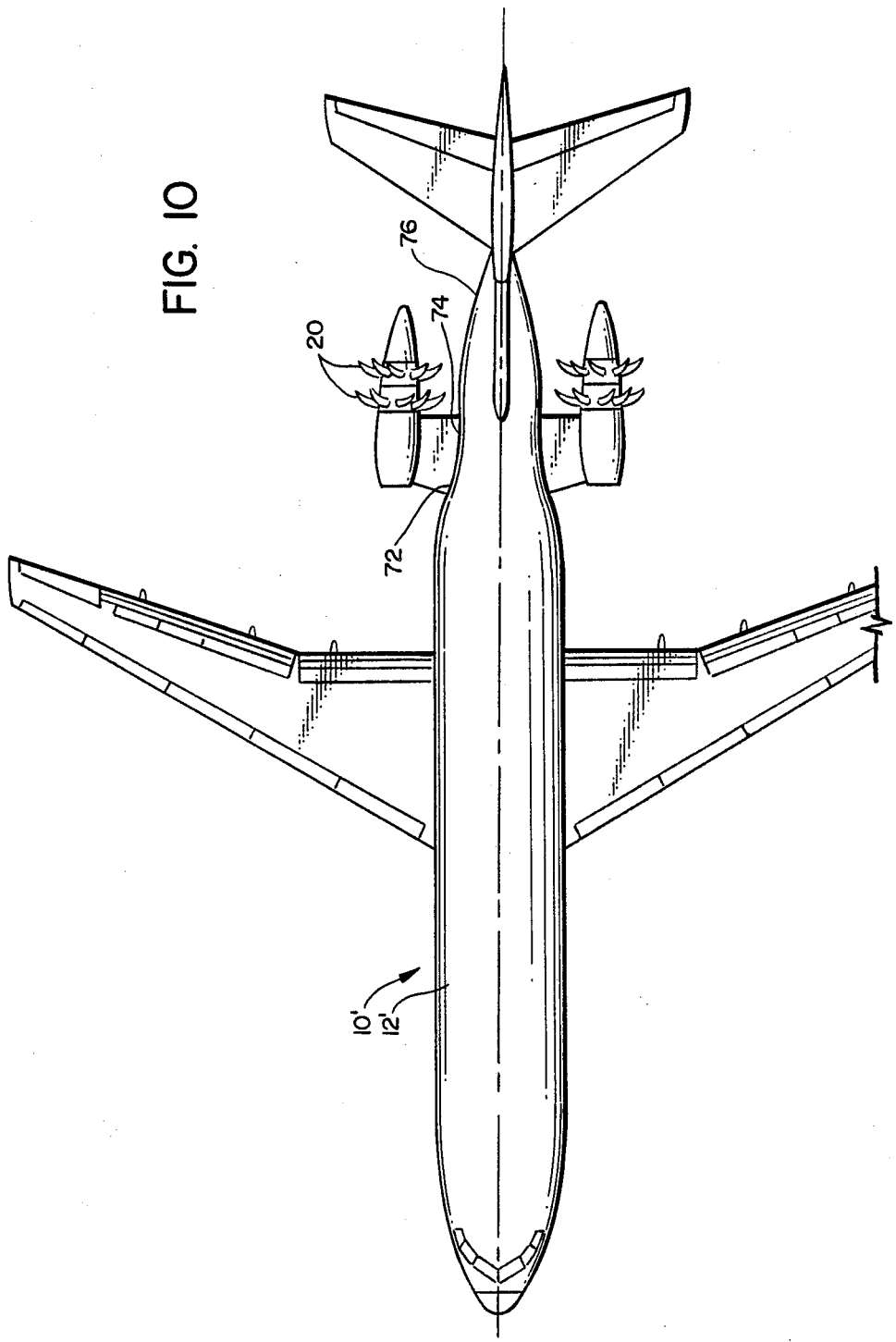
FIG. 10 is a top plan view illustrating the present invention being incorporated in an aircraft having aft mounted engines, where the engines are mounted to a fuselage having a configuration illustrated in copending application Ser. No. 120,637, filed Nov. 13, 1987.

In FIG. 10, the present invention is shown being incorporated into an aircraft having an aft body design such as that disclosed in U.S. patent application Ser. No. 120,637, filed Nov. 13, 1987. It can be seen that the aircraft 10' has the aft end of the fuselage 12' shaped in a manner that it tapers inwardly at 72 to an intermediate aft section 74 where the cross-sectional configuration is more uniform along the length of this intermediate section 74. Then there is an aft rear portion 76 where the exterior surface closes to an end location. It has been found that this particular fuselage configuration tends to straighten the flow in the area of the propellers 20' to improve propeller performance. Further, this has the effect of alleviating to some extent the growth of the thickness of boundary layer air adjacent to the aft end of the fuselage 12'. The present invention can be utilized effectively with this aircraft configuration, and the advantages described above can be achieved in this configuration.

Figure 11:
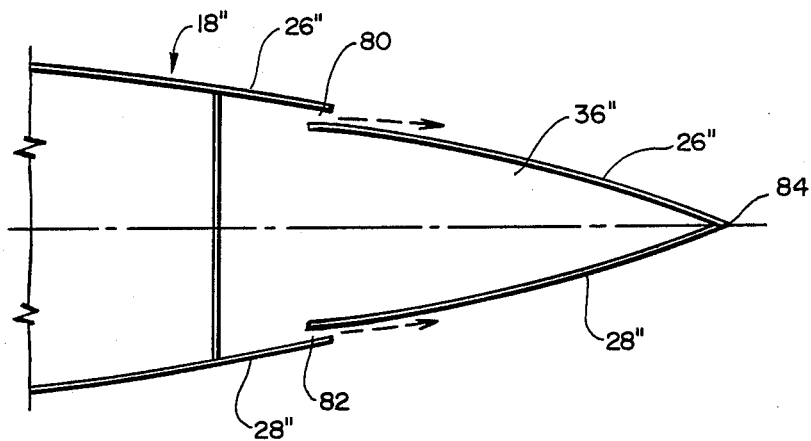
FIG. 11 is a sectional view of an aft portion of the strut showing a modified slot configuration.

A modified form of the slot means of the present invention is illustrated in FIG. 11. There is shown the aft portion of a strut 18'', where there are upper and lower slots 80 and 82 which are formed at the trailing edge portions of the upper and lower aerodynamic surfaces 26'' and 28'', respectively. These slots 80 and 82 are arranged so that the air discharged through these slots 80 and 82 flows tangentially along the surfaces 26" and 28" toward the end edge portion 84. The air plenum 36" is formed in the trailing edge portion adjacent to the slots 80 and 82. The operation of this modified slot arrangement of FIG. 11 is substantially the same as in this previous embodiment. Sufficient pressurized air is blown through these slots 80 and 82 so as to remove the discontinuity in the airflow which would otherwise be caused by the wake of the strut 18". It is evident that other specific slot configurations could be used without departing from the teachings of the present invention.

It should be understood that the present invention can be used effectively with a simple row propeller. Further, the strut could be in the form of a vertical fin for the tail empenage of the aircraft, with the engine being mounted to the fin or to the fuselage itself.

Also, it is to be understood that various modifications could be made to the present invention without departing from the basic teachings thereof.

What is claimed is:

1. An engine mounting assembly comprising:
   a. an aircraft structure having a fuselage;
   b. an engine having an unducted propeller means, said engine being mounted in said assembly in a pusher configuration, said propeller means being adapted to rotate through a propeller path;
   c. a strut being mounted in said assembly at a location forwardly and upstream of said propeller means;
   d. said strut having a leading edge portion and a trailing edge portion, and being aerodynamically contoured so as to have first and second side surfaces over which air flows, said trailing edge portion having a rearwardly directed slot means positioned to discharge air in a downstream direction between airflow passing over said side surfaces of the strut, with the air discharged from the slot means traveling downstream to an affected path region of the propeller path;
   e. air supply means to discharge pressurized air through said slot means at a velocity adequate to diminish discontinuity of airflow moving from said strut rearwardly to the affected path region of the propeller path;
   f. said strut having an inner end portion connecting to said fuselage and an outer end portion connected to said engine, said slot means extending toward said first end of the strut and adjacent to said fuselage in a manner that at least some of the air discharged from the slot means passes adjacent said fuselage at a location radially outward of said propeller path, said slot means and said air supply means being arranged so that for each unit of length along said slot means, a relatively greater amount of air is discharged from said slot means at a location more closely adjacent to the inner end portion of the strut, in comparison with an amount of air discharged at a location directly forward of said propeller path;
   whereby load variations on the propeller means passing through the affected region of the propeller path are diminished, and boundary layer air at a junction of the strut and the fuselage is activated.

2. The assembly as recited in claim 1, wherein said engine is mounted to an aft section of said fuselage.

3. The assembly as recited in claim 3, wherein said engine is a turboprop engine.

4. The assembly as recited in claim 1, wherein said engine is a turboprop engine.

5. The assembly as recited in claim 1, wherein said slot means comprises a slot located at a trailing edge of said strut.

6. The assembly as recited in claim 1, wherein said slot means comprises a plurality of slots located at the trailing edge portion of the strut.

7. The assembly as recited in claim 6, wherein said slot means comprises at least two slots, each of which is located on a rear portion of a related one of the side surfaces of the strut, with the two slots discharging air in a rearward direction substantially parallel to the airflow passing over the side surfaces of the strut.

8. A method of operating an engine mounting assembly, which comprises:
   a. an aircraft structure having a fuselage;
   b. an engine having an unducted propeller means mounted to the engine in a pusher configuration;
   c. a strut being mounted in said assembly at a location forwardly and upstream of said propeller means, said strut having a leading edge portion and a trailing edge portion, and being aerodynamically contoured so as to have first and second side surfaces over which air flows,
   said method comprising:
   a. rotating said propeller means through a propeller path;
   b. providing said trailing edge portion with a rearwardly directed slot means positioned to discharge air in a downstream direction between airflow passing over said side surfaces of the strut, with the air discharged from the slot means traveling downstream to an affected path region of the propeller path;
   c. providing pressurized air and discharging said pressurized air through said slot means at a velocity adequate to diminish discontinuity of airflow moving from said strut rearwardly to the affected path region of the propeller path;
   d. said method further being characterized in that said strut has an inner end portion connecting to said fuselage and an outer end portion connected to said engine, said slot means extending toward said first end of the strut and adjacent to said fuselage in a manner that at least some of the air discharged from the slot means passes adjacent said fuselage at a location radially outward of said propeller path, said slot means and said air supply means being arranged so that for each unit of length along said slot means, a relatively greater amount of air is discharged from said slot means at a location more closely adjacent to the inner end portion of the strut, in comparison with an amount of air discharged at a location directly forward of said outward location of said propeller path;
   whereby load variations on the propeller means passing through the affected region of the propeller path are diminished so as to in turn diminish unwanted vibrations transmitted from said propeller means into said engine, reduce noise and improve performance, and boundary layer air at a junction of the strut.

9. The method as recited in claim 8, wherein said engine is mounted to an aft section of said fuselage.

10. The method as recited in claim 9, wherein said engine is a turboprop engine.

* * * * *